United States Patent Office 2,709,170
Patented May 24, 1955

2,709,170

BENZANTHRONEPYROLEANTHRONE BLACK VAT DYESTUFFS

Francis Irving and Alistair Livingston, Blackley, Manchester, England, assignors to Imperial Chemical Industries Limited, a corporation of Great Britain No Drawing. Application August 11, 1952, Serial No. 303,837

Claims priority, application Great Britain August 31, 1951

1 Claim. (Cl. 260—275)

This invention relates to new black vat dyestuffs.

The commercially available direct dyeing black vat dyestuffs all have poor fastness to soda-boiling, and they give stains on adjacent white cotton during the soda-boiling treatment. These dyestuffs are in general obtained from impure starting materials by processes which are not fully understood, so that inconsistent results in manufacture and application are not uncommon.

We have now discovered a new class of direct dyeing black vat dyestuffs which are free from these objections.

In British specification No. 344,057 a process is described for the manufacture of vat dyestuffs or intermediate products of the benzanthronepyrazoleanthrone series by causing an amino-benzanthronepyrazoleanthrone to react with a compound capable of reacting with hydrogen atoms attached to a nitrogen atom, other than a negatively substituted dibenzanthrone or isodibenzanthrone. Among the compounds which it was proposed to use, there were mentioned acid anhydrides and acid halides, for example acetic anhydride, benzoyl chloride and cyanuric chloride.

In British specification No. 345,651 it was proposed to manufacture vat dyestuffs by condensing bromobenzanthronepyrazoleanthrones of unknown constitution with organic compounds containing a replaceable hydrogen or metal atom attached to a nitrogen, oxygen or sulphur atom. Among the organic compounds it was proposed to use, there was mentioned benzamide and it was said that amides of anthraquinone carboxylic acids would react similarly.

The new black dyestuffs of our invention are those which are obtained by condensing certain amino derivatives of benzanthronepyrazoleanthrones with the halide of particular anthraquinone carboxylic acids, namely with a halide of 1-nitro- or 1-amino-anthraquinone-2-carboxylic acid.

According to our invention therefore we provide new vat dyestuffs of the formula:

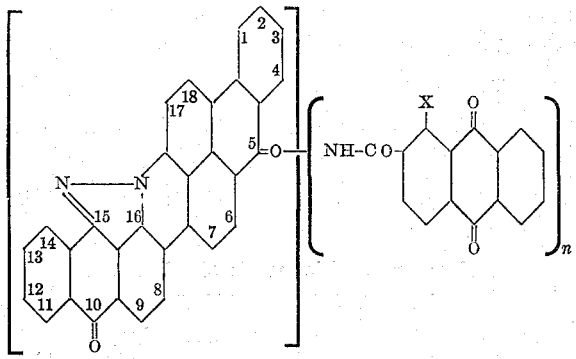

wherein $n$ is 1 or 2, X is nitro- or amino- and the anthraquinone carboxylic acid amide groups are attached to the 3, 9, 11 or 14 positions of the benzanthronepyrazoleanthrone nucleus.

The system of numbering used in this specification is that given for the parent ring compound at page 378, No. 3,919 in the "The Ring Index" by Patterson and Capell, published by the Reinhold Publishing Corporation of New York, 1940.

According to a further feature of our invention we provide a process for the manufacture of new vat dyestuffs which comprises treating an amino-benzanthronepyrazoleanthrone containing one or two amino groups in the 3, 9, 11 and 14 positions with a halide of 1-nitro- or 1-amino-anthraquinone-2-carboxylic acid, and when the 1-nitro compound is used, optionally replacing the nitro by an amino group.

When 1-nitro-anthraquinone-2-carboxylic acid halide is used for the acylation, the reduction to the amino compound may be effected during the vatting process but the reduction is preferably carried out before the vatting process, for example by treating the nitro compound with ammonia or a commonly used reducing agent.

If desired 1-chloro-anthraquinone-2-carboxylic acid can be used for the acylation and the chlorine atom, then replaced by an amino group.

The amino-benzanthronepyrazoleanthrones used as starting materials in the process of the present invention may be made by a number of methods. 3-bromobenzanthrone may be condensed with an α-amino or acylaminopyrazoleanthrone and the product subjected to a mild alkali fusion. 3-bromobenzanthrone may be condensed with an α-chloropyrazoleanthrone, the chloro-group replaced by or converted to an amino group and the product subjected to a mild alkali fusion. 3-bromo-9-nitro-benzanthrone may be condensed with pyrazoleanthrone, the nitro group reduced and the product subjected to a mild alkali fusion or 3-bromo-9-benzoylaminobenzanthrone may be condensed with pyrazoleanthrone and the product subjected to a mild alkali fusion. 3:9-dibromobenzanthrone may be condensed with one molecular proportion of pyrazoleanthrone, the residual bromine atom replaced by a substituent group from which an amino group is readily obtained, for example a p-toluenesulphonamino-group, the product subjected to a mild alkali fusion and the substituent group converted to amino, for example, when the substituent group is toluenesulphonamino, by acid hydrolysis. Finally 3-bromo-9-nitrobenzanthrone may be condensed with a substituted pyrazoleanthrone, for example an acylaminopyrazoleanthrone, the nitro group then reduced and the product subjected to a mild alkali fusion.

The condensation of the amino-benzanthronepyrazoleanthrone with the 1-nitro-, or 1-amino-anthraquinone-2-carboxylic acid halide may be brought about by heating the reagents together in a suitable liquid, for example nitrobenzene and the condensation product may then be filtered off from the cooled reaction mixture. When the 1-nitro compound is used, the condensation product may be reduced, if desired, for example by heating it in nitrobenzene or other liquid medium and passing ammonia through the heated mixture.

The new dyestuffs of our invention dye cellulosic materials in deep black shades of good all-round fastness properties and they are superior to the hitherto known direct black vat dyestuffs in their fastness to soda-boiling treatments.

The invention is illustrated but not limited by the following examples in which the parts are by weight:

*Example 1*

A suspension of 18 parts of very finely divided 11-amino-benzanthronepyrazoleanthrone in 600 parts of nitrobenzene is heated at 140–145° C. to remove any moisture present and then the suspension is stirred at this temperature whilst 14 parts of 1-nitro-anthraquinone-2- carboxylic acid chloride are added uniformly during 5 hours. The mixture is stirred at 140–145° C., for 18 hours, then heated during 3 hours to 200° C., and stirred at 200–210° C., for 5 hours. The mixture is cooled and the solid in suspension is filtered off, washed successively with nitrobenzene, pyridine, ethanol, dilute aqueous ammonia and water and dried. The fine black powder so obtained is stirred in 360 parts of nitrobenzene at 190–200° C., for 6 hours whilst a slow current of dry ammonia gas is passed through, and the new dyestuff is then isolated by filtration, and washing with the solvents indicated above. It dyes vegetable fibres from a black vat in bluish grey shades which can be built up to form a strong black shade. The dyeings have very high all-round fastness and are notably superior to dyeings from previously known black vat dyestuffs in their resistance to soda boiling as shown by the effect on the dyeings themselves and in the lack of stain on adjacent white material.

11-amino-benzanthronepyrazoleanthrone which itself is a navy-blue vat dyestuff is obtained by reacting 1-chloro-5-benzoylaminoanthraquinone with hydrazine, condensing the resulting benzylamino-1':9'-pyrazoleanthrone with 3-bromobenzanthrone and subjecting the product to a mild fushion with alcoholic potassium hydroxide.

*Example 2*

The 11-amino-benzanthronepyrazoleanthrone used in Example 1 is replaced by 3-amino-benzanthronepyrazoleanthrone, which itself is obtained by nitrating 3-bromobenzanthrone, condensing the 3-bromo-9-nitrobenzanthrone (melting point 292° C.) so obtained, with pyrazoleanthrone, reducing the condensation product with stannous chloride in a mixture of glacial acetic acid and hydrochloric acid and fusing the amino compound so obtained with alcoholic potash. The resulting dyestuff dyes vegetable fibres from a black vat in neutral grey shades which can be built up to a strong black shade. The fastness properties are similar to those of the product of Example 1.

*Example 3*

The 11-amino-benzanthronepyrazoleanthrone used in Example 1 is replaced by 9-amino-benzanthronepyrazoleanthrone which is itself obtained by reacting 1-chloro-4-benzoylaminoanthraquinone with hydrazine, condensing the product with 3-bromo-benzanthrone and subjecting the condensation product to a mild fusion with alcoholic caustic potash.

The resulting dyestuff dyes vegetable fibers from a black vat in reddish-grey shades which can be built up to very dark navy blue and finally to reddish-black shades.

*Example 4*

In place of the 11-amino-benzanthrone pyrazoleanthrone used in Example 1 there is used 14-amino-benzanthronepyrazoleanthrone which is obtained either by condensing the amino-pyrazoleanthrone prepared from 8-chloro-1-amino-anthroquinone and described in British specification No. 345,728 with 3-bromo-benzanthrone, or by condensing the chloropyrazoleanthrone obtained from 1:8-dichloroanthraquinone and hydrazine with 3-bromobenzanthrone and converting the chloro derivative so obtained to the corresponding amino derivative. The 14-amino-benzanthronepyrazoleanthrone is then obtained by mild fusion with alcoholic potassium hydroxide.

The dyestuff obtained by acylation of this compound with 1-nitroanthraquinone-2-carboxylic acid chloride followed by reduction as described in Example 1 dyes vegetable fibres from a black vat in grey shades which can be built up to form a strong bluish-black shade.

*Example 5*

A suspension of 22 parts of finely divided 3:11-diamino-benzanthronepyrazoleanthrone in 400 parts of nitrobenzene is heated at 140–145° C. to remove any moisture present and then the suspension is stirred at this temperature and 32 parts of 1-nitroanthraquinone-2-carboxylic acid chloride are added during 5 hours. The mixture is stirred at 140–145° C. for 18 hours and then at 200–210° C. for a further 2 hours. The mixture is cooled and the solid in suspension is filtered off, washed with nitrobenzene and steam distilled until it is free from nitrobenzene. The suspension of solid in boiling water is then made alkaline with ammonia and the product is filtered off, washed with water and dried. The black powder is ground up and reduced by stirring it in a dilute solution of sodium hydroxide and sodium hydrosulphite at 0–5° C. for 1 hour. The leuco compound is oxidised by blowing air through the solution and the new dyestuff is filtered off and washed with water. It dyes vegetable fibres from a black vat in reddish-grey shades which can be built up to a strong reddish-black shade.

The 3:11-diaminobenzanthronepyrazoleanthrone used in the above example may be obtained by condensing the benzoylamino-1':9'-pyrazoleanthrone obtained from 1-chlor-5-benzoylaminoanthraquinone and hydrazine with 3-bromo-9-nitrobenzanthrone, reducing the product with sodium sulphide in boiling alcohol and fusing the amino compound so obtained with alcoholic potash.

What we claim is:

New vat dyestuffs of the formula

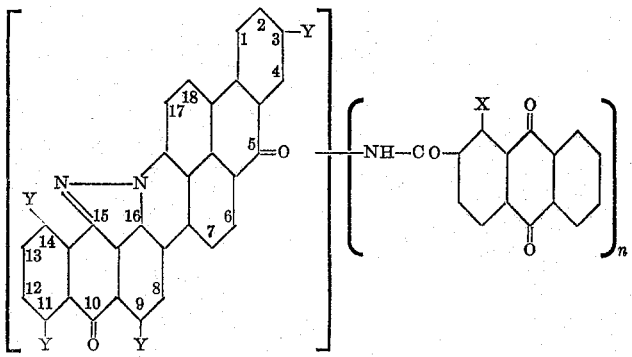

wherein $n$ is an integer from 1 to 2, X is selected from the group consisting of nitro and amino, and each anthraquinone carboxylic acid amide group is attached to the benzanthronepyrazoleanthrone nucleus at one of the positions designated by Y.

References Cited in the file of this patent

UNITED STATES PATENTS

| 1,857,553 | Kunz et al. | May 10, 1932 |
| 1,966,125 | Koeberle | July 10, 1934 |